Sept. 8, 1936.  C. G. O'DONNELL  2,053,874
EDUCATIONAL DEVICE
Filed Oct. 21, 1935  2 Sheets-Sheet 1

INVENTOR.
CATHERINE GERTRUDE O'DONNELL
BY
Lee J. Gary
ATTORNEY.

Sept. 8, 1936.   C. G. O'DONNELL   2,053,874
EDUCATIONAL DEVICE
Filed Oct. 21, 1935    2 Sheets-Sheet 2
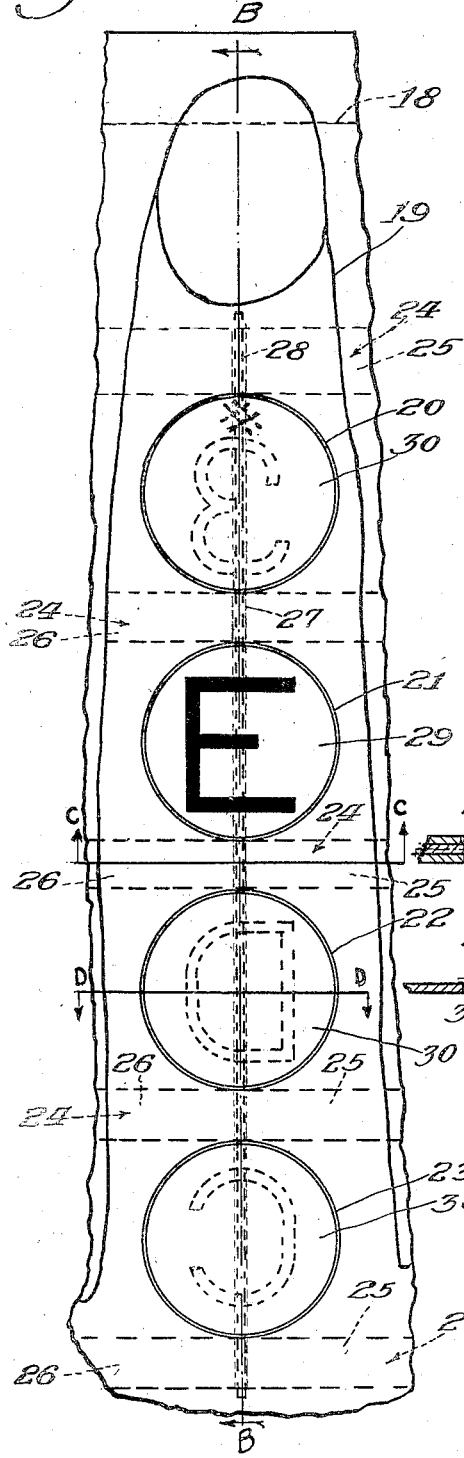
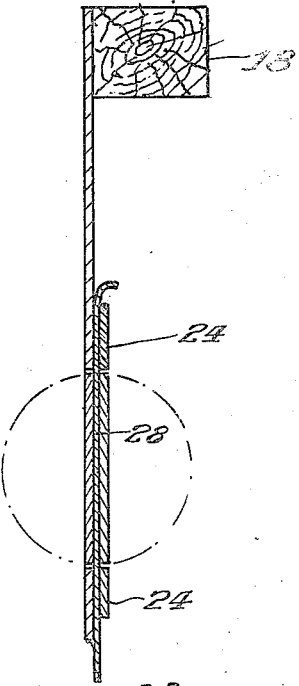
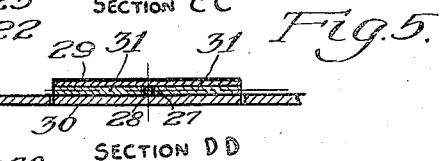
INVENTOR.
CATHERINE GERTRUDE
O'DONNELL
BY
Lee J. Gary
ATTORNEY.

Patented Sept. 8, 1936

2,053,874

UNITED STATES PATENT OFFICE 2,053,874

EDUCATIONAL DEVICE

Catherine Gertrude O'Donnell, Toledo, Ohio

Application October 21, 1935, Serial No. 45,896

4 Claims. (Cl. 35—5)

This invention relates to improvements in educational devices, and refers specifically to a device utilizable in the teaching of the so called "touch system" in typewriting.

The objects and advantages of my invention will be apparent from the accompanying drawings and following detailed description.

In the drawings, Fig. 1 is a face view of my device.

Fig. 2 is an enlarged detail view of one portion of the device shown in Fig. 1.

Fig. 3 is a fragmentary sectional view taken on line B—B of Fig. 2.

Fig. 4 is a transverse sectional view taken on line C—C of Fig. 2.

Fig. 5 is a transverse sectional view taken on line D—D of Fig. 2.

Figure 1:
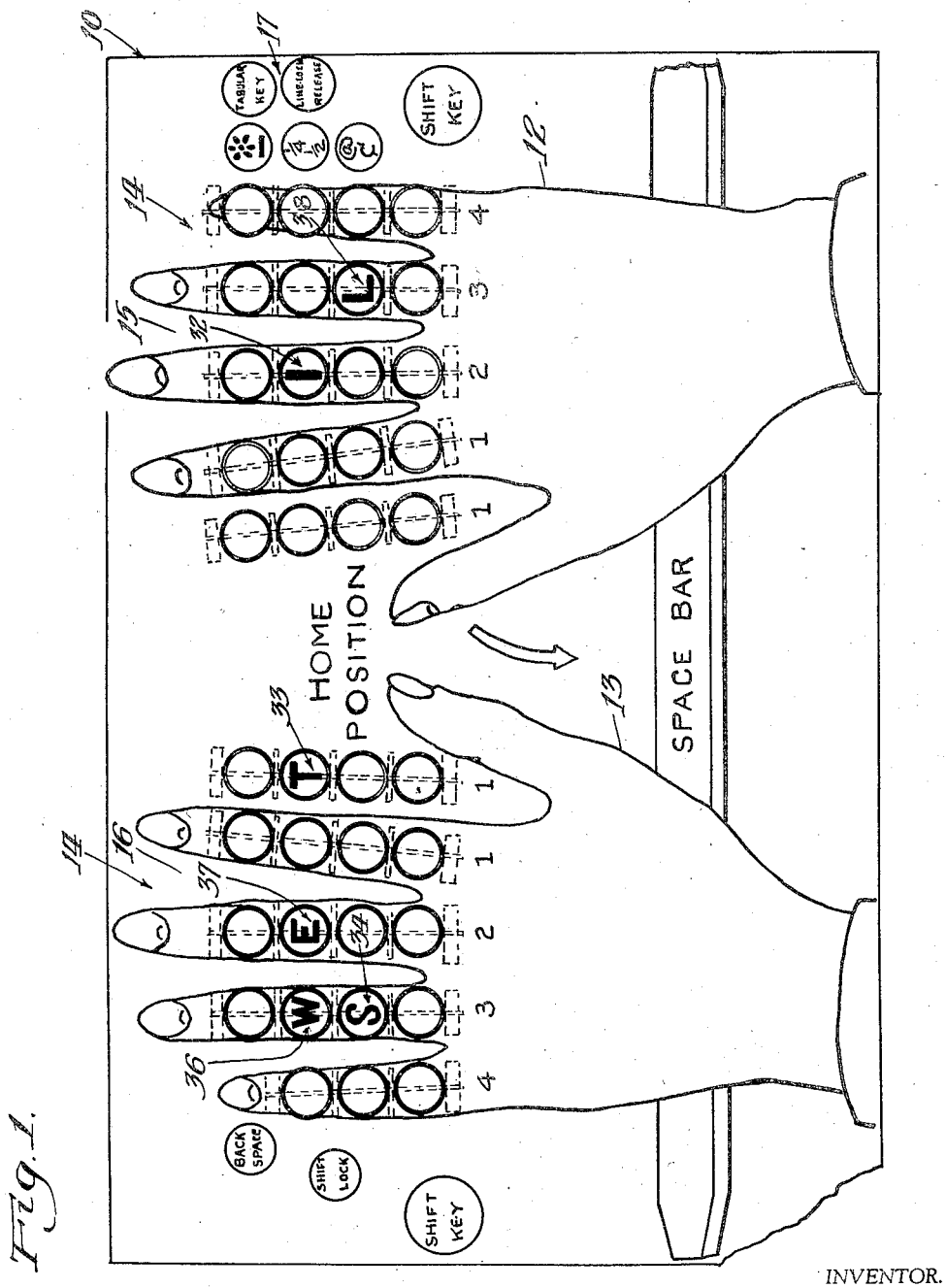

Referring in detail to the drawings, 10 indicates a chart which is adapted to be positioned within the view of a student or students, preferably upon the wall of a class room in plain view of the class. The chart 10 has inscribed, by printing, lithographing or the like, upon its face, the representation of the right and left hands 12 and 13 respectively, of a typist. A represented typewriter keyboard 14 is also inscribed upon the face of the chart, all of the represented keys being in substantially the same relative relationship existent upon the usual typewriter keyboard. However, to emphasize the co-relationship of the keys to each hand, the keys indicating the common keys, that is, the letters, numbers, and common punctuation marks, are separated into two distinct banks, one bank 15 allotted to the right hand and the other bank 16 allotted to the left hand.

In the touch system of typewriting, the keys of the typewriter are assigned to predetermined fingers, for instance, the fourth finger, or little finger of the left hand is adapted to manipulate the left most vertical row of the common keys in addition to the "back space" key, the "shift lock" key and the left "shift key". In chart 1, the represented left hand is so disposed with respect to the represented keyboard as to bring the fourth finger of said hand over the the leftmost vertical row of common keys. This position of the represented hand automatically superimposes the third finger, the second finger and the first finger, respectively, over the second, third and fourth vertical rows of keys, reading from left to right. In the touch system, the first finger, or index finger, additionally manipulates another vertical row of keys, the fifth row. Consequently, the fifth row is represented adjacent the fourth row and superimposed index finger.

The same relationship holds true for the right hand, and therefore, the fingers of the represented right hand 12 are superimposed upon the first, second, third and fourth vertical rows of keys, the little finger also being adapted to manipulate the special keys 17 indicated at the right of the chart and the index finger being adapted to manipulate the fifth row of common keys, reading from right to left.

This represented relationship of the hands, fingers and keys is similar to the actual position of the "touch" typist's hands in normal position before activities are commenced. Of course, in actual normal position, the typist's finger tips rest upon the keys but the chart 10 is intended to indicate the relationship between the fingers and the keys and not the wrist or arched finger position conducive to the proper striking of the keys.

Referring particularly to Figs. 2, 3, 4 and 5, the constructional details of the chart 10 are illustrated. The body of the chart may be constructed of cardboard, plywood, sheet metal, celluloid or any like relatively thin, light rigid sheet material. The chart may be mounted upon a wooden frame 18 which may traverse one or more of the side edges, the frame serving to reinforce the chart and space the same from a wall or other support.

In Fig. 2 an enlarged portion of the chart is illustrated showing a finger 19 corresponding to finger 2 of the left hand, as shown in Fig. 1. To this finger in the touch system of typewriting, four keys of the typewriter are allotted, namely, the keys corresponding to the numeral 3 and letters E, D and C. Accordingly, four apertures 20, 21, 22 and 23 are provided in the chart surface within the area described by said finger, the apertures being disposed in a vertical row. A plurality of strips of material 24 similar to the material comprising chart 10, may be secured to the rear face of the chart transversely of finger 19. Included between each of the strips and the rear face of the chart are two sections 25 and 26 spaced from each other so as to provide a recess 27. A metal pin 28 may be positioned in all of said recesses, the sections 25 and 26 and strips 24 serving as guides or supports for said pin. Pin 28 spans each of the apertures 20, 21, 22 and 23 diametrically.

Each of those portions of pin 28 which spans apertures 20, 21, 22 and 23, carries a disc made up of elements 29 and 30, separated by substantially semi-circular disc-sections 31, a space for pin 28 being provided between the edges of the disc-sections and said first mentioned elements.

Element 30 of each disc has a blank face and the face of the other element 29 carries an inscribed letter or numeral. It is possible, therefore, to expose either the blank face 30 or the inscribed face 29 by revolving the discs about pin 28. The lettered faces 29 are disposed upon the fingers of the inscribed hands and place the numbers and letters substantially in their proper relative position as to the tiers of keys. For example, the upper disc of each finger, with the exception of the little finger on the inscribed left hand will have faces 29 indicating numbers. The next lower discs 29 will have faces indicating the letters of the third tier of typewriter keys, and so on.

In the use of my invention, the chart 10 may be hung on a class room wall in plain view of a class of beginning students. The students may or may not be supplied with typewriters. A simple sentence may be dictated by the instructor, for instance, the sentence: "It is I". With the eyes of the students focused on the chart, not on their typewriter keyboard, the instructor may expose the face 29 of the disc 32, indicating the location of the key "I" its position as to row and tier and the finger to be used in striking said key, and simultaneously indicating to the students, the location of the proper "shift key" for capitals. The remaining letters of the sentence may be similarly exposed, as at 33, and 34 in Fig. 1. Other simple sentences such as: "It is well" may be used necessitating the exposure of the letter faces of discs 36, 37 and 38. Of course, initially all of the discs are so positioned as to expose their blank faces and as the student's familiarity with the keyboard progresses exercises may be devised for exploring the entire keyboard. In this manner, the student's eyes will be focused away from the keyboard in front of them and yet a picture of said keyboard may be conjured in their minds. The beginning student readily associates the keyboard with his fingers and very quickly obtains the "feel" of the keyboard.

It is apparent that, inasmuch as my invention is broadly directed to a device which assists in associating the fingers of a student's hand or hands to predetermined portions of a key board or the like, my invention can also be used, with various simple and self-apparent changes, for assisting in the correlation of a student's fingers with the strings, frets or keys of musical instruments of the violin or piano family. By the use of such a device class instruction in fingering and hand and finger position may be more efficiently presented. In harmony classes, chords of the major, minor, augmented, diminished, seventh, ninth, etc. could readily be explained.

I claim as my invention:

1. A chart utilizable in the teaching of the "touch system" of typewriting which comprises, a panel having a display surface, a pair of hand representations upon said display surface, and movable elements carried on said panel and associated with the fingers of said hand representations, each of said elements having one blank face and having one face inscribed with one or more typewriter keyboard indicia corresponding to those keys to be struck by the corresponding finger of the typist, said elements being movable to expose either the blank face or the face having the inscribed indicia.

2. A chart utilizable in the teaching of the "touch system" of typewriting which comprises, a panel having a display surface, a pair of hand representations upon said display surface, and swingable elements carried on said panel and associated with the fingers of said hand representations, each of said elements having one blank face and having one face inscribed with one or more typewriter keyboard indicia corresponding to those keys to be struck by the corresponding finger of the typist, said elements being swingable to expose either the blank face or the face having the inscribed indicia.

3. A chart utilizable in the teaching of the "touch system" of typewriting which comprises, a panel having a display surface, a pair of hand representations upon said display surface, said display surface being provided with a plurality of apertures within the area of each of the fingers of the hand representations, and discs carried on said panel and swingably disposed in said apertures, each of said discs having a blank face and a face inscribed with one or more typewriter keyboard indicia corresponding with those keys to be struck by the corresponding finger of the typist, said discs being swingable to expose either the blank face or the face having the inscribed indicia.

4. A chart utilizable in associating the fingers of a student's hand with a keyboard which comprises, a panel having a display surface, a hand representation upon said display surface, said display surface being provided with a plurality of apertures within the area of each of the fingers of the hand representation, and elements pivotally mounted on said panel and disposed in said apertures, each of said elements having a blank face and a face inscribed with one or more keyboard indicia corresponding to those keys to be struck by the corresponding finger of the student, said elements being movable to expose either the blank face or the face having the inscribed indicia.

CATHERINE GERTRUDE O'DONNELL.